US009714848B2

United States Patent
Yanobe

(10) Patent No.: US 9,714,848 B2
(45) Date of Patent: Jul. 25, 2017

(54) ANGLE DETECTION DEVICE AND SURVEY INSTRUMENT INCLUDING THE SAME

(71) Applicant: Kabushiki Kaisha TOPCON, Tokyo (JP)

(72) Inventor: Satoshi Yanobe, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 14/816,253

(22) Filed: Aug. 3, 2015

(65) Prior Publication Data

US 2016/0033307 A1     Feb. 4, 2016

(30) Foreign Application Priority Data

Aug. 4, 2014   (JP) ................. 2014-159065

(51) Int. Cl.
| | |
|---|---|
| G01C 25/00 | (2006.01) |
| G01B 11/26 | (2006.01) |
| G01D 5/347 | (2006.01) |
| G01C 3/02 | (2006.01) |
| G01C 1/02 | (2006.01) |
| G01C 15/00 | (2006.01) |

(52) U.S. Cl.
CPC ............ *G01D 5/3473* (2013.01); *G01C 3/02* (2013.01); *G01C 1/02* (2013.01); *G01C 15/002* (2013.01)

(58) Field of Classification Search
CPC .......... G01D 5/3473; G01C 3/02; G01C 1/02; G01C 15/002
USPC ........................................................... 356/6
See application file for complete search history.

(56) References Cited

U.S. PATENT DOCUMENTS

| | | | |
|---|---|---|---|
| 4,518,859 A | 5/1985 | Hoshika | |
| 4,790,694 A * | 12/1988 | Wilent | .............. H05K 3/4638 |
| | | | 408/1 R |
| 2006/0138485 A1* | 6/2006 | Jung | .............. H01L 27/14621 |
| | | | 257/292 |

(Continued)

FOREIGN PATENT DOCUMENTS

| | | |
|---|---|---|
| JP | 2007-178320 A | 7/2007 |
| WO | 2012/011037 A1 | 1/2012 |
| WO | 2012/153309 A2 | 11/2012 |

OTHER PUBLICATIONS

The extended European search report issued by the European Patent Office on Nov. 30, 2015, which corresponds to European Patent Application No. 15179491.4-1557 and is related to U.S. Appl. No. 14/816,253.

*Primary Examiner* — Hina F Ayub
(74) *Attorney, Agent, or Firm* — Studebaker & Brackett PC

(57) ABSTRACT

An angle detection device include photoemitters, photodetectors, a scale plate disposed therebetween, and a control section to control them. The control section includes an analog-front-end (AFE) to convert analog signals of the photodetectors to digital signals and an arithmetic processor to detect a rotating posture of the scale plate based on the digital signals. The control section simultaneously emits lights from the photoemitters and simultaneously receives the lights by the corresponding photodetectors. The control section then executes the following data processing for each photodetector one by one in sequence: outputting the analog signals representing an entire area of a light-receiving area of one of the photodetectors and outputting the digital signals converted by the AFE to the processor.

8 Claims, 14 Drawing Sheets

(56) References Cited

U.S. PATENT DOCUMENTS

2008/0205707 A1* 8/2008 Braunecker .............. G01C 1/04
  382/106
2015/0373321 A1* 12/2015 Bridges ................ G01S 17/023
  348/46

* cited by examiner

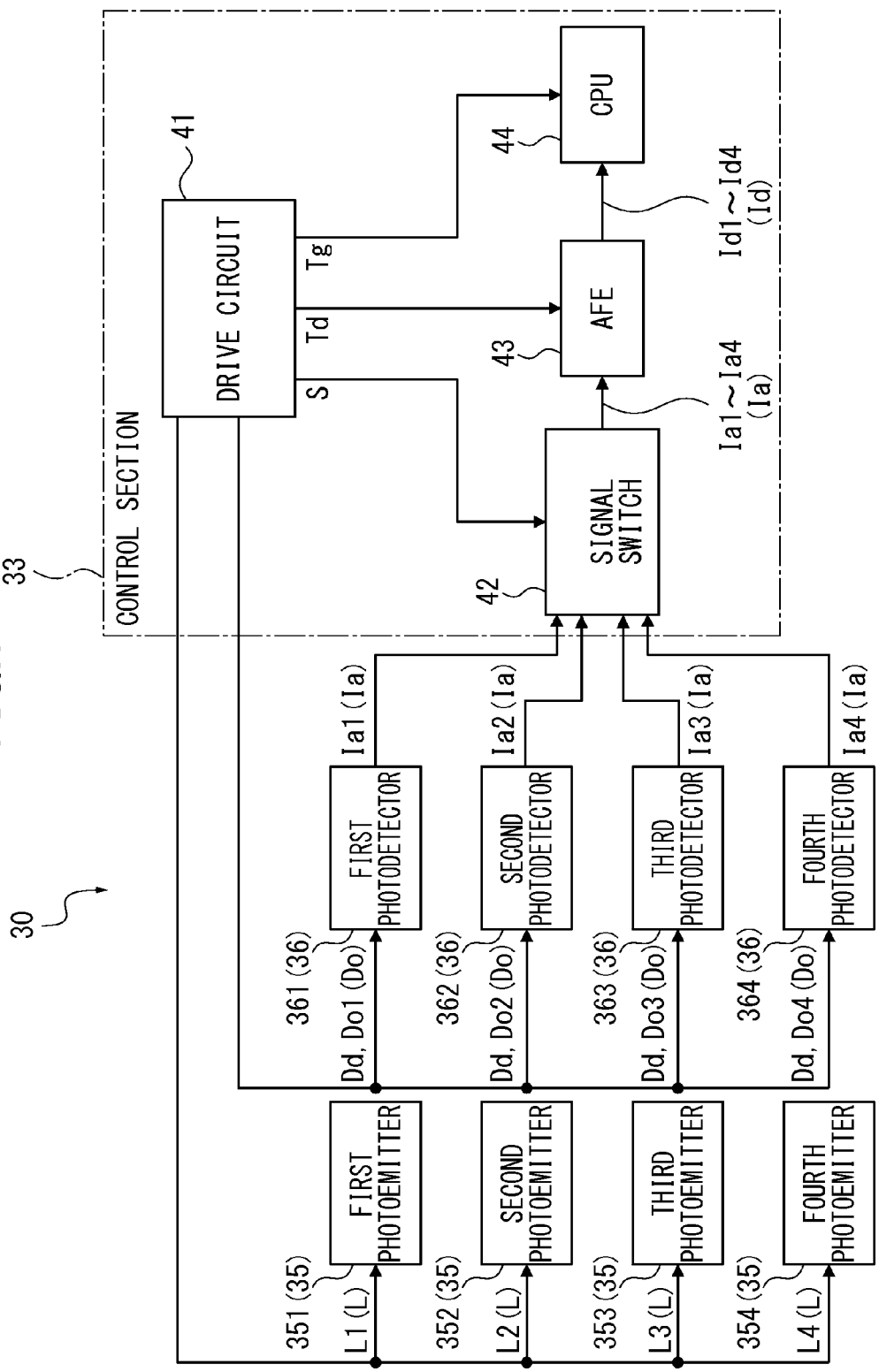

ANGLE DETECTION DEVICE AND SURVEY INSTRUMENT INCLUDING THE SAME

CROSS-REFERENCE TO RELATED APPLICATION

The present application is based on and claims priority to Japanese patent application No. 2014-159065, filed Aug. 4, 2014, the disclosure of which is hereby incorporated by reference herein in its entirety.

BACKGROUND

Technical Field

The present invention relates to an angle detection device including a plurality of photodetectors and a survey instrument installed with the angle detection device.

Description of Related Art

Survey instruments that detect horizontal angles and vertical angles by using angle detection devices have been known. For example, an angle detection device that detects horizontal angles and vertical angles by using two absolute encoders is taught by Patent Document 1 (Japanese Laid-Open Patent Publication No. 2007-178320). Each of the absolute encoders has two pairs of photoemitters and photodetectors and the photoemitters and the corresponding photodetectors are disposed so as to interpose a scale plate between them (i.e., the photoemitter and the corresponding photodetector form an opposed angle detector). Note that each of the photodetectors has a linear light-receiving area. The pairs of the photoemitters and photodetectors are arranged to be rotatable around the center of the scale plate. Accordingly, each of the absolute encoders of the angle detection device can detect horizontal angles and vertical angles as negating angle detection errors caused by wobbling of the rotary shaft.

Each of the absolute encoders of the conventional angle detection device has a CPU (arithmetic processor) that processes analog signals outputted from each photodetector and measures or calculates the horizontal angle and vertical angle as negating angle detection errors caused by wobbling of the rotary shaft. The conventional angle detection device appropriately amplifies the analog signals by an Analog-Front-End (AFE) and converts the analog signals into digital signals. The digital signals are then outputted to the CPU, and the CPU calculates the horizontal angle and vertical angle based on the digital signals.

SUMMARY

Since the conventional angle detection device is configured to be the opposed angle detector, the detection of the light performed by each photodetector needs to be synchronized with others. Further, the survey instrument installed with the angle detection device needs to detect the horizontal angle and the vertical angle simultaneously. Accordingly, the angle detection device needs to synchronize the detections performed by the four photodetectors. To do so, the angle detection device may be configured to have four AFEs for the four photodetectors respectively, to emit lights from the four photoemitters simultaneously against the corresponding photodetectors, and to output the analog signals simultaneously from the photodetectors to the corresponding AFEs. In this case, each of the AFEs of the angle detection device simultaneously receives the analog signals, simultaneously converts the received analog signals into the digital signals, and outputs the digital signals to the CPU. Here, the photodetectors are used to acquire or detect a rotating posture of the scale plate by obtaining an image of the entire light-receiving area. Specifically, each of the photodetectors forms analog image data in accordance with the analog signals representing the entire light-receiving area of the photodetector. Further, each of the AFEs converts the analog signals into the digital signals to form digital image data so as to detect the rotating posture of the scale plate. However, it is difficult for the CPU to collectively process the digital image data if the four of the AFEs simultaneously input the four digital image data to the CPU.

Therefore, the angle detection device may be configured to have four digital data memories respectively connected to the four AFEs such that each of the AFEs outputs the converted digital signals to the corresponding digital data memory. The angle detection device then outputs the digital image data from the four digital data memories to the CPU. Accordingly, the CPU can collectively process the four digital image data. With this, the angle detection device can appropriately detect the horizontal angle and the vertical angle simultaneously. However, the above configuration needs as many AFEs and the digital data memories as the photodetectors, thereby increasing in the size.

To solve the above problem, it is an object of the present invention to provide an angle detection device to simultaneously detect angles with a plurality of photodetectors without an increase in the size.

To achieve the above object, an aspect of the present invention provides an angle detection device which includes a plurality of photoemitters, a plurality of photodetectors each having a linear light-receiving area, a scale plate disposed between a plurality of photoemitters and the plurality of the photodetectors, and a control section that controls the plurality of the photoemitters and the plurality of the photodetectors. The control section includes an analog-front-end that converts analog signals sent from each of the plurality of the photodetectors into digital signals and an arithmetic processor that detects a rotating posture of the scale plate based on the converted digital signals. The control section simultaneously emits lights from the plurality of the photoemitters, simultaneously receives the emitted lights by the corresponding photodetectors respectively, and executes the following data processing: outputting the analog signals representing an entire area of the light-receiving area of one of the plurality of the photodetectors to the analog-front-end, converting the outputted analog signals into the digital signals with the analog-front-end, and outputting the converted digital signals to the arithmetic processor, for each of the plurality of the photodetectors one by one in sequence.

BRIEF DESCRIPTION OF DRAWINGS

FIG. 7 is a block diagram showing a configuration of a control system of the angle detection device;

DETAILED DESCRIPTION

Hereinafter, an angle detection device and a survey instrument installed with the angle detection device according to the present invention will be explained with reference to the drawings.

Figure 1:
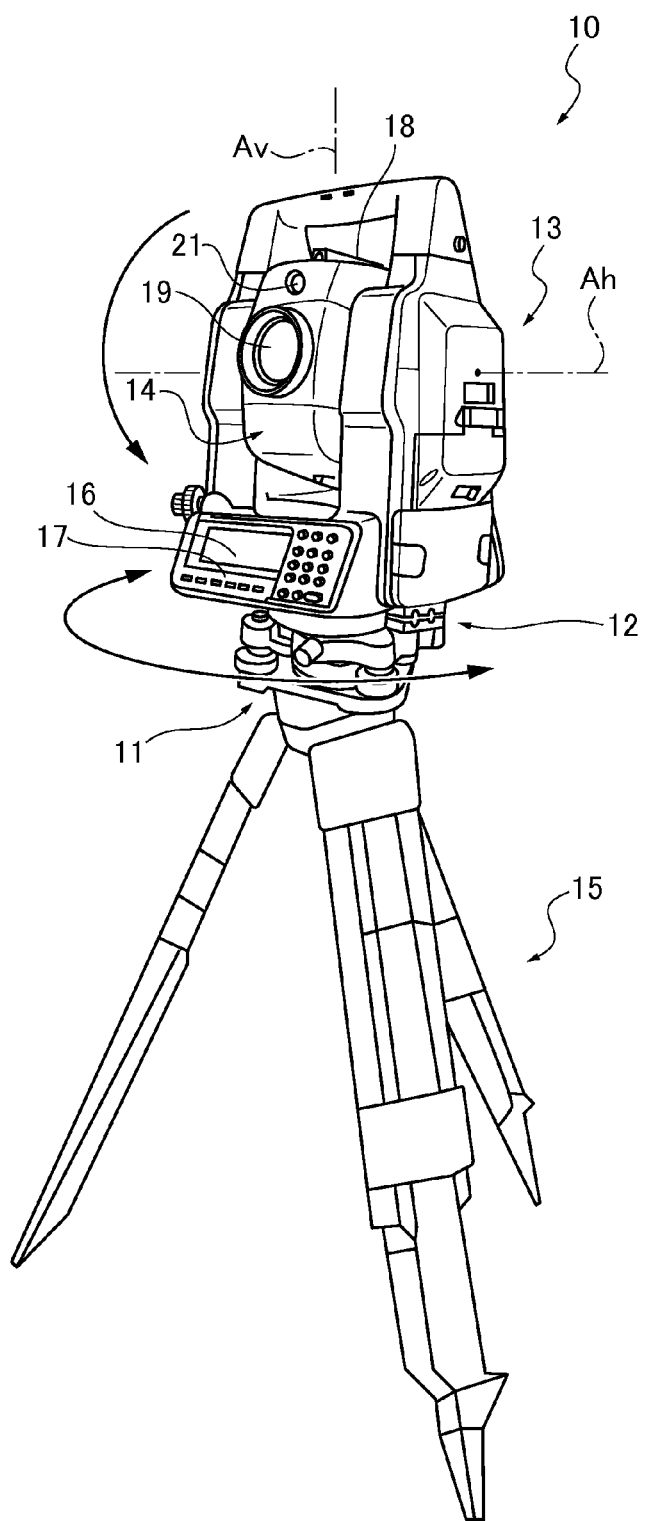
FIG. 1 is a schematic view illustrating a survey instrument according to an embodiment of the present invention.

As illustrated in FIG. 1, a survey instrument 10 of the embodiment is a total station. The survey instrument 10 emits a pulse laser beam toward a measuring point, receives a pulse reflected light, and accurately measures a distance to the measuring point. The survey instrument 10 includes a leveling unit 11, a base unit 12, a frame unit 13, and a telescope unit 14.

The leveling unit 11 is connected to a tripod 15 and detects a tilt of the survey instrument 10 (telescope unit 14). The base unit 12 is installed in the leveling unit 11, and a tilt angle of the base unit 12 is adjustable with respect to the leveling unit 11. The frame unit 13 is installed in the base unit 12 rotatably around a vertical axis Av. The frame unit 13 is equipped with a display 16 and an input part 17. The input part 17 is manipulated to operate the various functions of the survey instrument 10. The input part 17 outputs commands (signals) corresponding to the inputs to a control unit 22 (shown in FIG. 2). The display 16 displays an operation image or measuring results in response to the manipulation inputted to the input part 17.

The telescope unit 14 is installed in the frame unit 13 rotatably around the horizontal axis Ah. The telescope unit 14 includes a front/rear sight 18, which is used to roughly collimate the survey instrument 10. The telescope unit 14 further includes a second telescope 19 used to collimate the survey instrument with respect to a measuring object and a first telescope 21 having low magnification and a wide range compared with those of the second telescope 19. Although not illustrated, the telescope unit 14 also includes a first imaging part, which acquires an image (wide angle image) at the collimation direction (or the substantially collimation direction) by using an optical system of the first telescope 21, and a second imaging part, which acquires an image (telescopic image) at the collimation direction by using an optical system of the second telescope 19. The telescope unit 14 also includes a distance measurement part sharing the optical system with the second telescope 19. The distance measurement part emits a measurement light toward the measuring object and executes an optical-wave distance measurement as receiving a reflected light from the object.

The telescope unit 14 is appropriately rotated around the vertical axis Av (in the horizontal direction) and around the horizontal axis Ah (in the vertical direction) by the control unit 22. The angle detection device 30 detects rotation angles around the vertical axis Av and rotation angles around the horizontal axis Ah of the telescope unit 14.

The frame unit 13 includes the control unit 22 (illustrated in FIG. 2) that integrally controls the operations of the survey instrument 10. The control unit 22 appropriately rotates the frame unit 13 and the telescope unit 14 in order to face the telescope unit 14 to a target direction and in order to scan a predetermined range. The control unit 22 also switches between the first telescope 21 and the second telescope 19. Further, the control unit 22 controls the first and second imaging parts to obtain an image with a desired magnification and controls the distance measurement part to measure a distance to the measuring point. Here, the control unit 22 acquires the horizontal angle and the vertical angle of the telescope unit 14 from the angle detection device 30. Accordingly, the control unit 22 drives or controls the leveling unit 11, base unit 12, frame unit 13, telescope unit 14, front/rear sight 18, second telescope 19, first telescope 21, and angle detection device 30.

Figure 2:
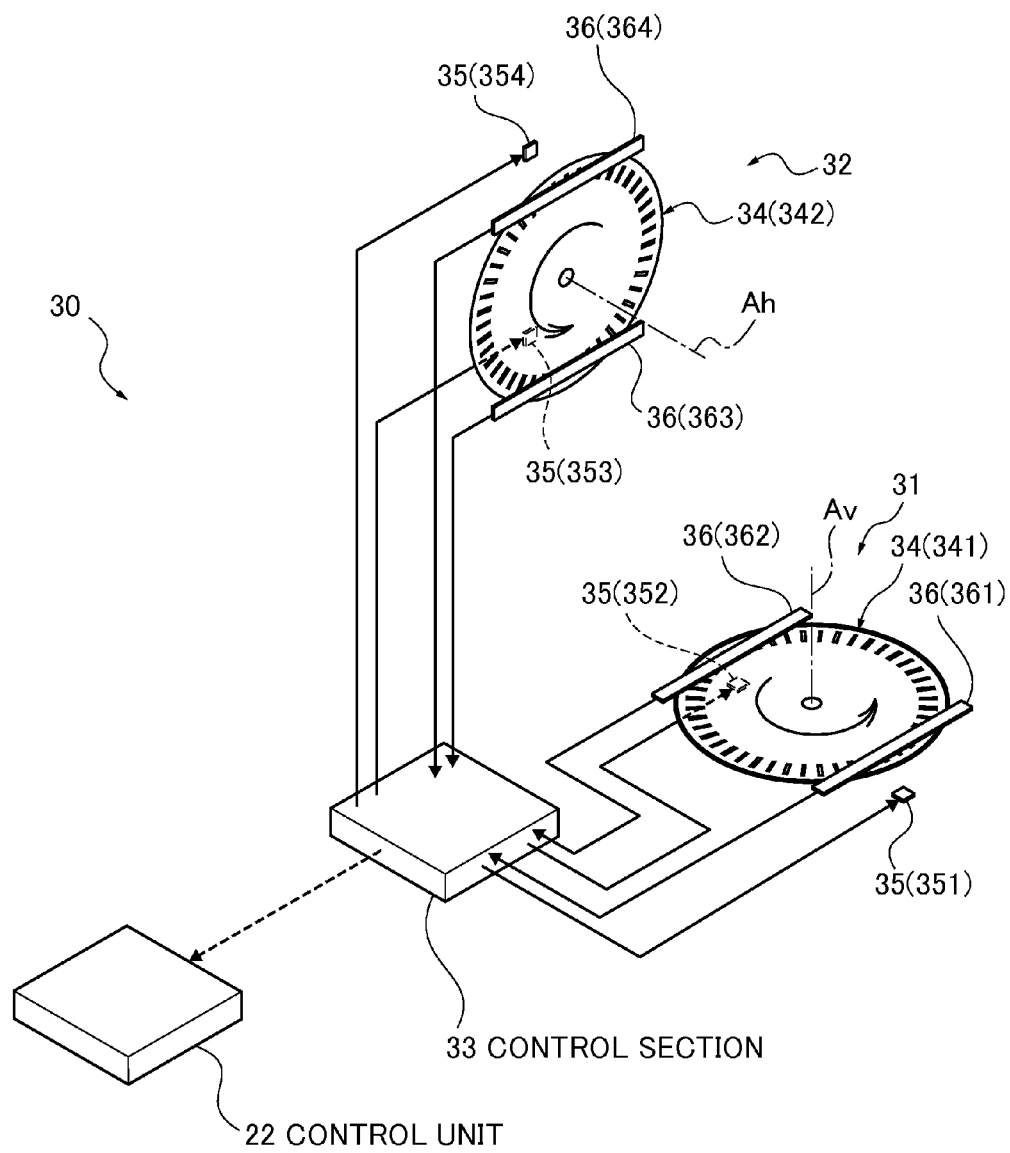
FIG. 2 is a schematic view illustrating an angle detection device of the survey instrument.

As illustrated in FIG. 2, the angle detection device 30 includes a horizontal angle detection section 31 to detect rotation angles of the telescope unit 14 around the vertical axis Av (i.e., in the horizontal direction), a vertical angle detection section 32 to detect rotation angles of the telescope unit 14 around the horizontal axis Ah (i.e., in the vertical direction), and a control section 33 to control the horizontal angle detection section 31 and the vertical angle detection section 32. The horizontal angle detection section 31 detects horizontal rotation angles of the frame unit 13 with respect to the base unit 12 to detect horizontal angles of the telescope unit 14 in the collimation direction. The vertical angle detection section 32 detects vertical rotation angles of the telescope unit 14 with respect to the frame unit 13 to detect vertical angles of the telescope unit 14 in the collimation direction. The horizontal angle detection section 31 and the vertical angle detection section 32 are basically identical, and the same configurations are given with the same reference numbers.

The horizontal angle detection section 31 and the vertical angle detection section 32 are disposed so as to face each other and to interpose a scale plate 34 between them (i.e., the scale plate is disposed between the horizontal angle detection section 31 and the vertical angle detection section 32). The horizontal angle detection section 31 and the vertical angle detection section 32 each has two pairs of photoemitters 35 and photodetectors 36. The two pairs of the photoemitters 35 and the photodetectors 36 are disposed so as to be rotationally symmetric with respect to the rotational center of the scale plate 34. To be specific, the angle detection device 30 includes one scale plate 34 (horizontal scale plate 341) and two photoemitters 35 (first photoemitter 351 and second photoemitters 352) together with the corresponding photodetectors 36 (first photodetector 361 and second photodetector 362) for detecting the horizontal angle; and the angle detection device 30 includes one scale plate 34 (vertical scale plate 342) and two photoemitters 35 (third photoemitter 353 and fourth photoemitter 354)

together with the corresponding photodetectors 36 (third photodetector 363 and fourth photodetector 364) for detecting the vertical angle.

The photoemitters 35 and photodetectors 36 are relatively rotatable to the corresponding scale plates 34, and each of the horizontal angle detection sections 31 and the vertical angle detection sections 32 configures an absolute encoder. In the embodiment, the scale plate 341 of the horizontal angle detection section 31 rotates with the horizontal rotation of the frame unit 13, while the scale plate 342 of the vertical angle detection section 32 rotates with the vertical rotation of the telescope unit 14.

Figure 3:
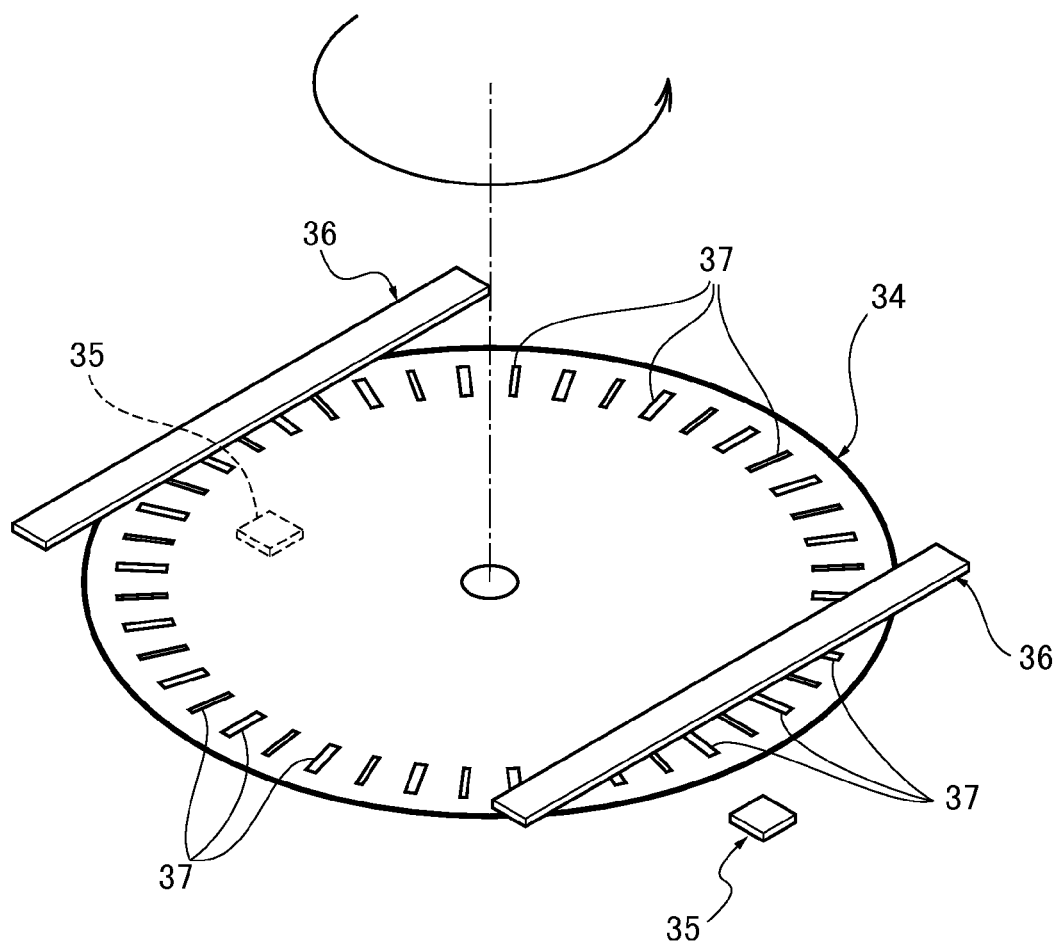
FIG. 3 is a schematic view illustrating two pairs of photoemitters and photodetectors facing each other through a scale plate.

As illustrated in FIG. 3, each of the scale plates 34 forms a disc shape and has a plurality of slits 37 at regular intervals in the radial direction at the outer circumferential edge. The slits 37 are used as a scale, and each of the slits 37 transmits light. In the embodiment, wide slits and narrow slits are alternately formed on the scale plates 34. Here, the light transmitted through the slits 37 is received by the photodetector 36, and analog signals Ia (analog image data) are produced based on the received light in the entire light-receiving area of the photodetector 36. The slits 37 are formed such that the produced analog signals Ia are different from each other with respect to the rotating postures of the scale plate 34. The scale plates 34 of this embodiment are formed by applying chromium-plating on the back side of a glass plate for blocking light and by removing the chromium-plating with etching process or the like for forming the slits 37.

Figure 4:
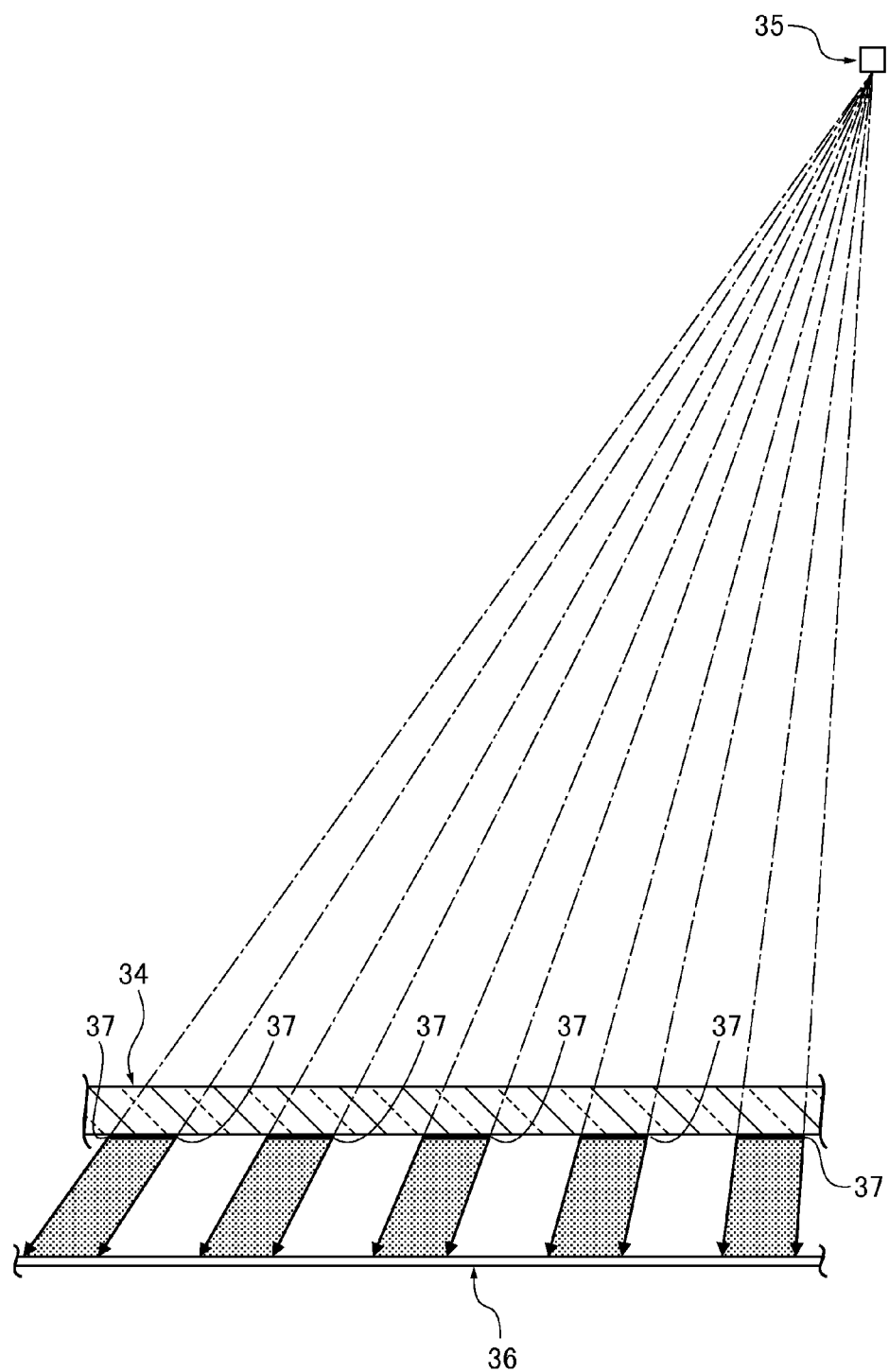
FIG. 4 is an explanatory view for explaining how to receive light emitted from the photoemitter and passed through the scale plate (i.e. through transmissive slits of the scale plate) by the photodetector.

As illustrated in FIG. 4, each of the photoemitters 35 emits light toward the slits 37 formed on the scale plate 34. The photoemitters 35 are configured with light emitting diodes.

The photodetectors 36 receive the lights that have been emitted from the corresponding photoemitters 35 and transmitted through the slits 37, and output the analog signals Ia corresponding to the amount of the received lights to the control section 33. Note that the photodetectors 36 are one-dimensional solid-state image sensors (linear image sensors) each having a linear light-receiving area by arranging a plurality of photo detection elements in series. The photodetectors 36 are configured to prevent deterioration of the analog signals Ia (detection values) from the time when the photodetectors 36 receive the lights and store values (detection values) corresponding to the received lights till the time when the photodetectors 36 output the analog signals to the control section 33. Preventing the deterioration of the signals means to suppress changes of the values (analog signals), so that the accuracy of the detection of the angles (horizontal angles and vertical angles) should not degrade.

The photodetectors 36 of the embodiment are configured with Complementary Metal Oxide Semiconductor (CMOS) image sensors. Accordingly, each photo detection element (pixel) of the photodetectors 36 stores electric charges corresponding to the amount of the received light, converts the stored electric charges into a voltage, and holds the voltage to suppress a change of the detection value (analog signal).

Each of the photodetectors 36 has 2000 photo detection elements arranged in series to form the light-receiving area and outputs analog signals Ia of the 2000 pixels. Each of the photodetectors 36 of the embodiment receives light transmitted through 60 slits 37 in the light-receiving area. Note that the analog signals detected by the first photodetector 361 are shown as Ia1, the analog signals detected by the second photodetector 362 as Ia2, the analog signals detected by the third photodetector 363 as Ia3, and the analog signals detected by the fourth photodetector 364 as Ia4.

As explained above, the angle detection device 30 (the horizontal angle detection section 31 and the vertical angle detection section 32) acquires analog signals Ia representing the entire light-receiving areas by using the photodetectors 36, and obtains images of the slits 37 representing rotating postures of the scale plates 34 as analog image data. Since the analog image data represent the lights that have been transmitted through the slits 37 and received by the photodetectors 36, the analog image data show waveforms corresponding to the slits 37.

Figure 5:
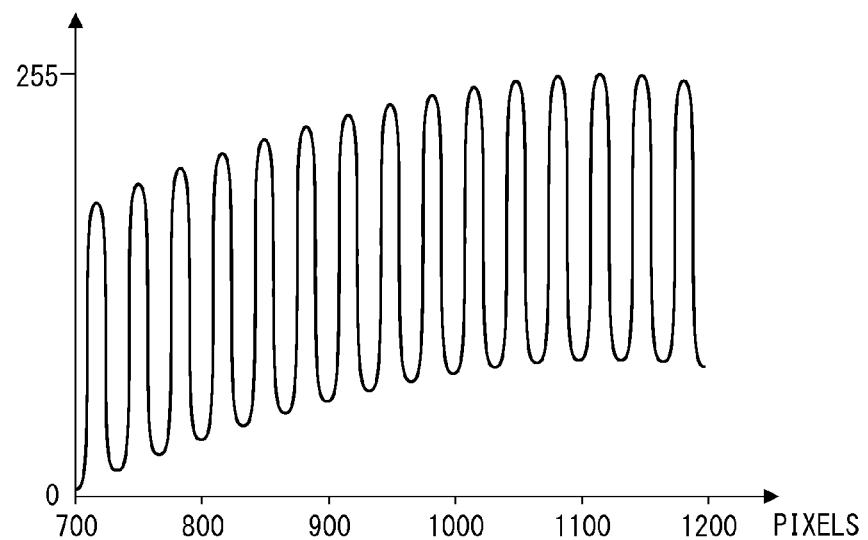
FIG. 5 is a graph showing an example of a digital signal.

The control section 33 produces digital signals Id by converting the analog signals Ia after amplifying and removing the noise from the analog signals Ia at AFE 43 (illustrated in FIG. 7). The control section 33 then outputs the produced digital signals Id to a CPU 44 (illustrated in FIG. 7). The digital signals Id show output values of the pixels with digital level values from 0 to 255 (illustrated in FIG. 5). The digital signals Id are used to generate digital image data having waveforms each corresponding to each slit 37 by processing the analog signals Ia representing the entire light-receiving area. Here, the photodetectors 36 of the embodiment receive the lights transmitted through 60 slits 37 at the light-receiving areas. As a result, the produced digital image data (as well as the analog image data) show waveforms with 60 ridges.

Figure 6:
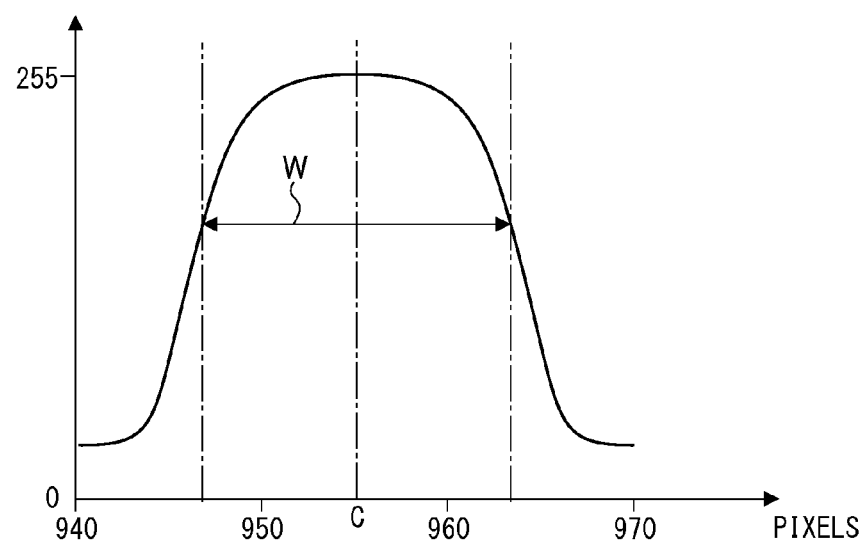
FIG. 6 is a graph partially showing the digital signal of FIG. 5.

As illustrated in FIG. 6, the control section 33 (to be specific, the CPU 44 of the control section 33) calculates a center position C and a width W of each ridge of the digital image data (digital signal Id). Note that the calculation of the center position C and the width W uses a conventional method, and the explanation will be omitted. The control section 33 (CPU 44) determines the position of the plurality of slits 37 based on the calculated center positions C and widths W to detect the rotating postures of the scale plates 34. Note that the determination of the positions of the slits 37 and the detection of the rotating postures also use conventional methods, and their explanation will be omitted.

As explained above, since each of the horizontal angle detection section 31 and the vertical angle detection section 32 has two pairs of photodetectors 36, the angle detection device 30 can negate detection errors caused by wobbling of the rotary shaft (not illustrated) of the scale plates 34, thereby achieving accurate detections.

By detecting a rotating posture of the horizontal scale plate 341 based on the outputs from the first photodetector 361 and second photodetector 362 of the horizontal angle detection section 31, the angle detection device 30 can detect the horizontal angle of the telescope unit 14 with respect to the collimation direction. By detecting a rotating posture of the vertical scale plate 342 based on the outputs from the third photodetector 363 and fourth photodetector 364 of the vertical angle detection section 32, the angle detection device 30 can detect the vertical angle of the telescope unit 14 with respect to the collimation direction.

As illustrated in FIG. 7, the control section 33 of the angle detection device 30 according to the embodiment includes a drive circuit 41, a signal switch 42, an analog-front-end (AFE) 43, and the CPU 44. The CPU 44 integrally controls the operations of the angle detection device 30 and functions as an arithmetic processor for detecting the rotating postures of the scale plates 34 by using the digital signals Id. The CPU 44 has a memory (not illustrated) for storing an operation program to drive the angle detection device 30, an arithmetic program to detect the rotating postures of the scale plates 34, and other programs.

Figure 8A:
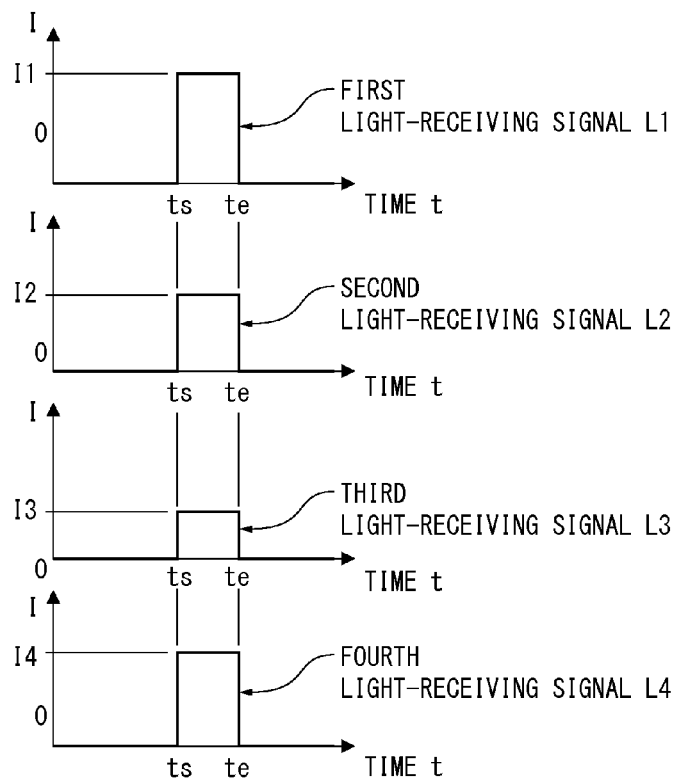
FIG. 8A is an explanatory view for explaining light-emitting signals outputted to the photoemitters from a controller to equalize a magnitude of the light emitted from the photoemitter.

The drive circuit 41 sends signals to the four-photoemitters 35, four-photodetectors 36, signal switch 42, AFE 43, and CPU 44 to detect angles (horizontal angle and vertical angle) with the angle detection device 30. Specifically, the drive circuit 41 sends light-emitting signals L to the photoemitters 35 respectively so as to simultaneously light up the photoemitters 35. For eliminating influence of individual differences of the photoemitters 35 and photodetectors 36, each of the light-emitting signals L is produced to adjust the light-emission intensity of each photoemitter 35. As illustrated in FIG. 8A, the light-emission start-times ts and the light-emission end-times to of the photoemitters 35 are respectively identical to each other. Accordingly, all the photoemitters 35 light up simultaneously. Further, the current values for the photoemitters 35 differ from each other so as to adjust the light-emission intensities of the photoemitters 35. In FIG. 8A, a light-emitting signal L1 sent to the first photoemitter 351 is shown as a current I1, a light-emitting signal L2 sent to the second photoemitter 352 as a current I2, a light-emitting signal L3 sent to the third photoemitter 353 as a current I3, and a light-emitting signal L4 sent to the fourth photoemitter 354 as a current I4.

Figure 8B:
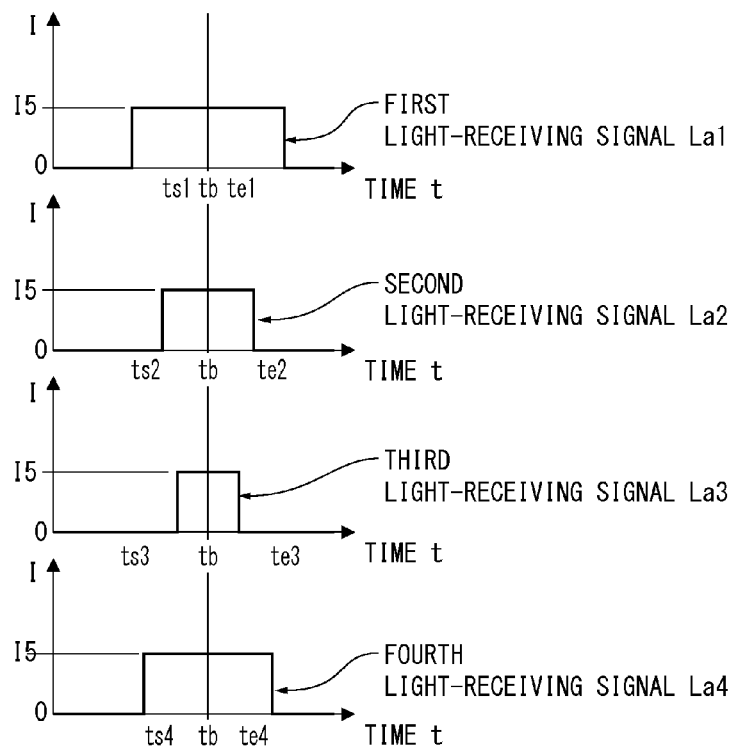
FIG. 8B is an explanatory view for explaining light-emitting signals similar to FIG. 8A.

In the embodiment, each of the currents I (light-emitting signals L) sent to the corresponding photoemitter 35 differs from each other. However, this should not be limited thereto. Any configurations capable of adjusting the light-emission intensities of the photoemitters 35 may be applicable. An example of other light-emitting signals La is illustrated in FIG. 8B. The currents I5 of the light-emitting signals La are identical to each other, but the intervals for emitting the lights differ from each other so as to adjust the light-emission intensities of the photoemitters 35. In the example of FIG. 8B, since the intervals for emitting the lights differ, the photoemitters 35 are not lighten up simultaneously. Therefore, base time tb (the middle of each interval) of each light-emitting signal L is arranged to be the same such that all of the photoemitters 35 can emit lights at the same time. Note that the light-emission start-time is or the light-emission end-time to of each light-emitting signal may be arranged to be the same instead of the base time tb. In FIG. 8B, the light-emission start-time and the light-emission end-time of the first light-emitting signal La1 are shown as ts1 and te1, those of the second light-emitting signal La2 as ts2 and te2, those of the third light-emitting signal La3 as ts3 and te3, and those of the fourth light-emitting signal La2 as ts4 and te4. Here, the light-emitting signals L and La are schematically illustrated in FIGS. 8A and 8B to facilitate understanding the adjustments of the light-emission intensities.

The drive circuit 41 sends collection signals (signals for receiving light) Dd to the photodetectors 36 such that the photodetectors 36 start receiving the emitted lights. Each of the photodetector 36 receives the light while the collection signal Dd is being inputted and holds a detection value (analog signal Ia) representing to the amount of the received light. For all the photodetectors 36, the same collection signals Dd are inputted simultaneously such that all the photodetectors 36 receive the lights simultaneously.

The drive circuit 41 sends an output signal Do to each photodetector 36. Each of the photodetectors 36 then outputs the analog signal Ia. Since the four photodetectors 36 output the analog signals Ia separately (i.e., at different timings), the output signals Do are sent to the photodetectors 36 separately. Note that the signal sent to the first photodetector 361 is shown as a first output signal Do1, the signal sent to the second photodetector 362 as a second output signal Do2, the signal sent to the third photodetector 363 as a third output signal Do3, and the signal sent to the fourth photodetector 364 as a fourth output signal Do4. The photodetectors 36 are connected to the signal switch 42.

The signal switch 42 selectively connects one of the photodetectors 36 and the AFE 43 by switching a transmission path upon receiving a switching signal S from the drive circuit 41. In this embodiment, the signal switch 42 first connects the first photodetector 361 with the AFE 43 when the signal switch 42 receives a first switching signal S. The signal switch 42 then connects the second photodetector 362 with the AFE 43 when receiving a second switching signal S (i.e., when receiving the switching signal S twice), connects the third photodetector 363 with the AFE 43 when receiving a third switching signal S (i.e., when receiving the switching signal S third times), connects the fourth photodetector 364 with the AFE 43 when receiving a fourth switching signal S (i.e., when receiving the switching signal S four times), and connects the first photodetector 361 with the AFE again when receiving a fifth switching signal S (i.e., when receiving the switching signal S five times). Accordingly, the switching signals S of this embodiment are identical to each other. Note that the switching signals S may differ for each photodetector 36, and should not be limited thereto.

The AFE 43 subtracts analog signals Ia from the signals outputted from the corresponding photodetector 36 and converts the analog signals Ia into digital signals Id when a convert-timing signal Td is inputted from the drive circuit 41. Here, the convert-timing signal Td synchronizes with the output signals Do, which are sent to the photodetectors 36. The AFE 43 then sends the digital signal Id to the CPU 44. Note that the AFE 43 executes the above operation for each analog signal Ia and outputs the digital signal Id to the CPU 44 for each digital signal Id since the AFE 43 does not have a memory to temporarily store the analog signals Ia and the digital signals Id. Hereinafter, the digital signals Id produced based on the light received by the first photodetector 361 are shown as first digital signals Id1, the digital signals Id produced based on the light received by the second photodetector 362 as second digital signals Id2, the digital signals Id produced based on the light received by the third photodetector 363 as third digital signals Id3, and the digital signals Id produced based on the light received by the fourth photodetector 364 as fourth digital signals Id4.

The CPU 44 acquires the inputted digital signal Id when an acquisition-timing signal Tg is inputted from the drive circuit 41. Here, the acquisition-timing signal Tg synchronizes with the convert-timing signal Td, which is sent to the AFE 43. Accordingly, the CPU 44 continuously receives the digital signals Id that correspond to the analog signals Ia (i.e., analog image data) acquired by the photodetectors 36. With this, the CPU 44 can process a digital image data obtained from the digital signals Id.

Figure 9:
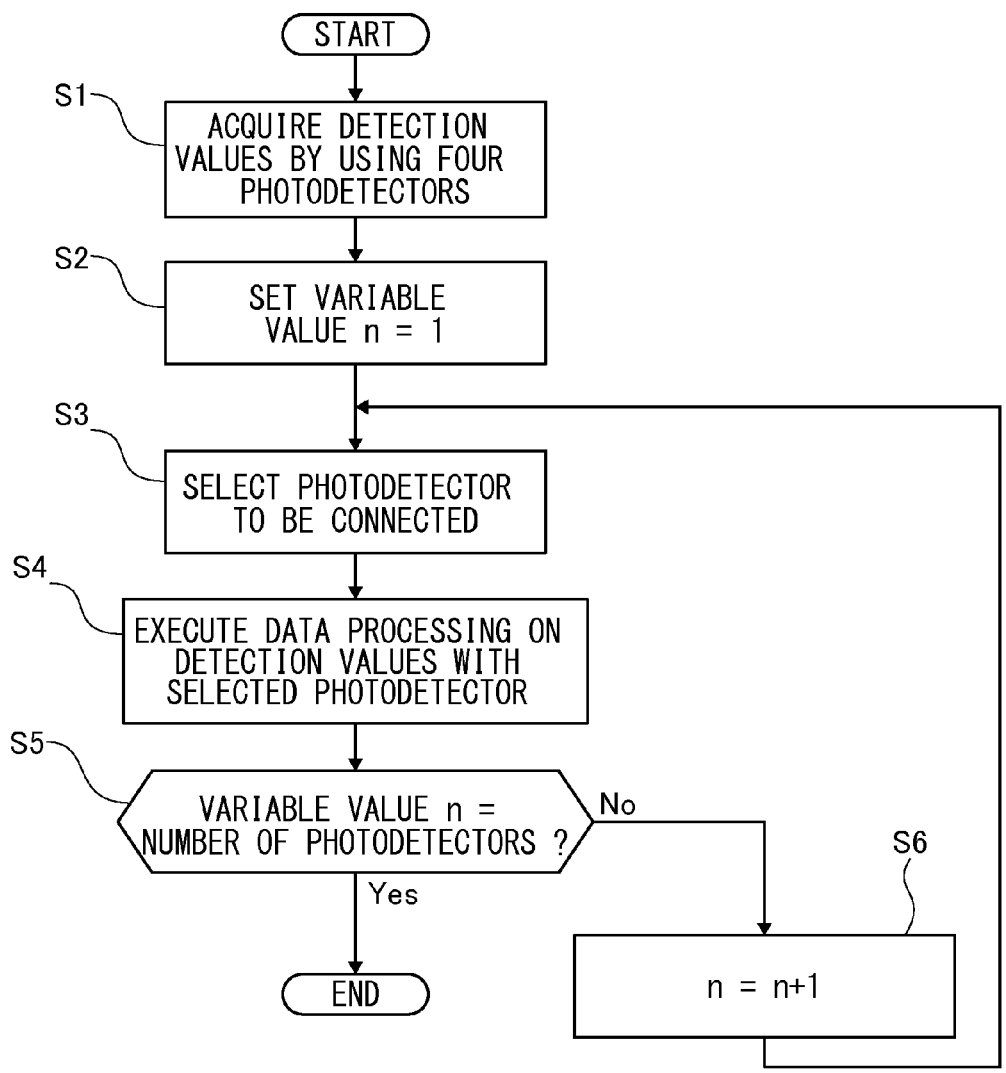
FIG. 9 is a flowchart showing data processing executed by a CPU.

Next, data processing for detecting an angle executed by the control section 33 (to be specific, the CPU 44) of the angle detection device 30 according to the embodiment will be explained with reference to FIG. 9. FIG. 9 is a flowchart showing the data processing (method) executed by the CPU 44. The control section 33 (to be specific, the CPU 44) starts the FIG. 9 flowchart upon receiving a request from the control unit 22 for detecting an angle by using the angle detection device 30.

In Step S1, the control section 33 controls the four photoemitters 35 to emit lights simultaneously and controls the four photodetectors 36 to receive the lights that have been emitted from the photoemitters 35 and transmitted through the slits 37 of the scale plate 34. Accordingly, the photodetectors 36 simultaneously acquire and store detection values (analog signals Ia).

In Step S2, the control section 33 sets a variable value n to 1 (initial value) and proceeds to Step S3.

In Step S3, the control section 33 selects one of the photodetectors 36 in accordance with the set variable value n. Specifically, the CPU 44 selects nth photodetector from the first to fourth photodetectors 361-364 in accordance with the set variable value n. The CPU 44 then connects the selected nth photodetector 36 with the AFE 43.

In Step S4, the CPU 44 of the control section 33 executes the data processing on the detection value (analog signal Ia) acquired by the selected photodetector 36 and proceeds to Step S5. To be specific, the CPU 44 outputs the analog signal Ia from the selected photodetector 36 to the AFE 43, and produces the digital signal Id after amplifying and removing the noise from the analog signal Ia at the AFE 43

In Step S5, the control section 33 determines whether the variable value n is equal to the number of the photodetectors 36 (i.e., in this embodiment, it determines whether the variable value n is four). When the result of the determination is YES, the control section 33 terminates the data processing (method). When the result of the determination is NO, the control section 33 proceeds to Step S6. That is to say, the control section 33 determines whether the data processing (Step S4) is executed to the detection values (analog signals Ia) of all of the photodetectors 36.

In Step S6, the control section 33 increments the value of the variable value n (i.e., n=n+1) and returns to Step S3. The control section 33 then executes the above data processing for the rest of photodetectors 36.

Figure 10:
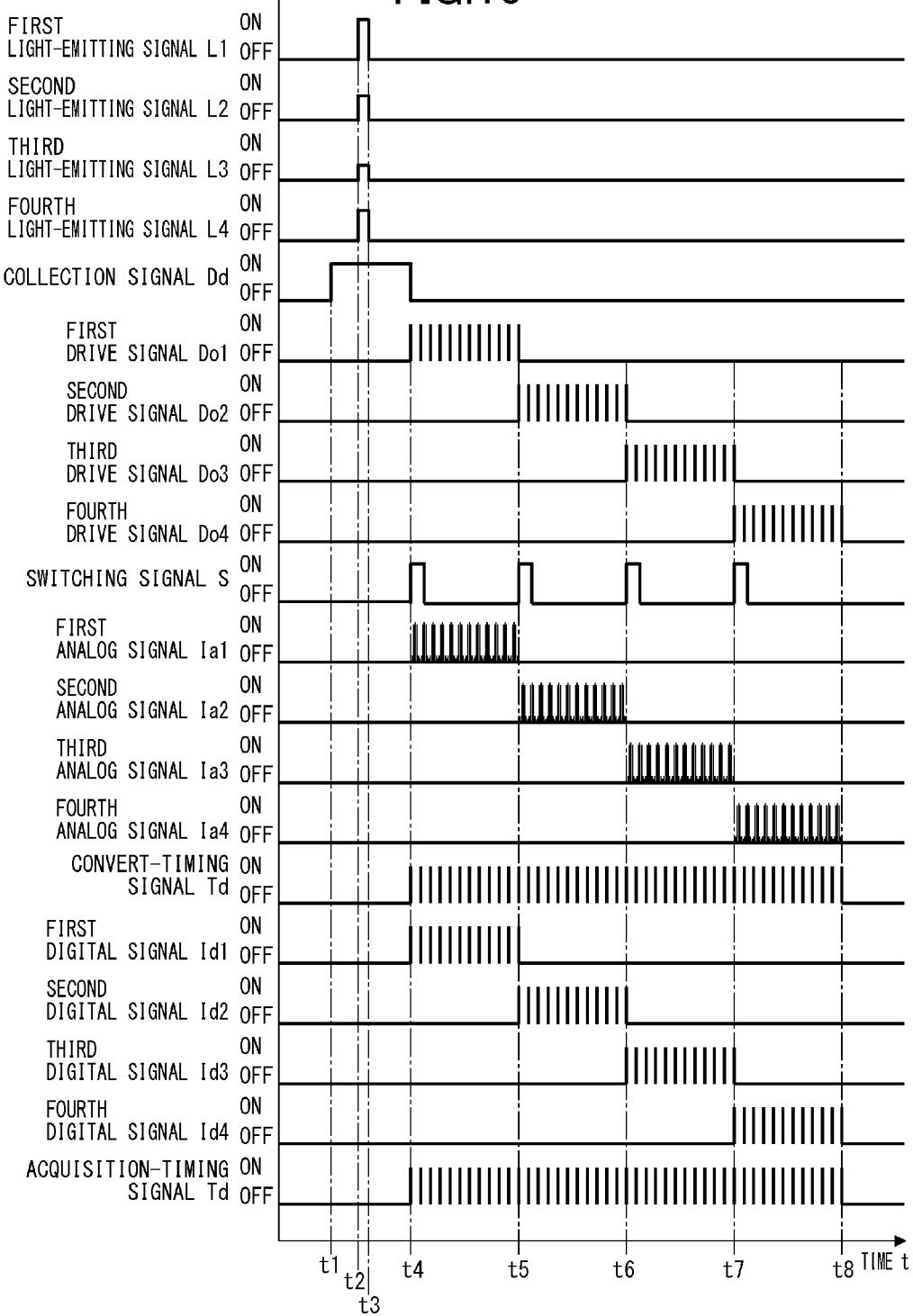
FIG. 10 is a time chart showing signals used when detecting a horizontal angle and a vertical angle by using the angle detection device.

Next, the operation for detecting the angles (horizontal angles and vertical angles) by using the angle detection device 30 (i.e., the angle detection control) will be explained with reference to FIG. 10 time chart. Note that FIG. 10 relatively shows timings of the signals, and the waveforms of the signals (specifically, output signals Do, analog signals Ia, convert-timing signal Td, digital signals Id, and acquisition-timing signal Tg).

First, the collection signals Dd are respectively outputted to the four photodetectors 36 from the drive circuit 41 of the control section 33 at the time t1. Next, the light-emitting signals L (L1 to L4) are respectively outputted to the corresponding photoemitters 35 (351-354) from the drive circuit 41 from the time t2 to the time t3. Then, the collection signals Dd are stopped at time t4. Accordingly, the lights simultaneously emitted from the four photoemitters 35 transmit through the slits 37 of the corresponding scale plates 34 and are received by the corresponding photodetectors 36 simultaneously, thereby producing analog signals (Ia1-Ia4), the values of which correspond to the amount received by the corresponding photodetectors 36 (Step S1).

Further, the drive circuit 41 outputs the switching signal S to the signal switch 42 at the time t4. Accordingly, the signal switch 42 connects the first photodetector 361 to the AFE 43 (Step S3). The drive circuit 41 also outputs the first output signal Do1 to the first photodetector 361, the convert-timing signal Td to the AFE 43, and acquisition-timing signal Td to the CPU 44. The drive circuit 41 then stops the first output signal Do1 at the time t5.

With this, the first photodetector 361 collectively outputs the first analog signals Ia1 (analog image data) representing the entire light-receiving area of the first photodetector 361 to the AFE 43 from the time t4 to the time t5. The AFE 43 converts the first analog signals Ia1 into the first digital signals Id1 after amplifying and removing the noise from the first analog signals Ia1 and outputs the first digital signals Id1 to the CPU 44 from the time t4 to the time t5. Here, the CPU 44 acquires the first digital signals (digital image data) representing the entire light-receiving area of the first photodetector 361.

Further, the drive circuit 41 outputs the switching signal S to the signal switch 42 at the time t5 (Step S5→Step S6→Step S3). Accordingly, the signal switch 42 connects the second photodetector 362 to the AFE 43 (i.e., switches from the first photodetector 361 to the second photodetector 362). By repeating the abovementioned process for the second to fourth photodetectors 362-364, the CPU 44 acquires the digital image data in accordance with the second to fourth digital signals Id2 to Id4 (time t5 to time t8).

Figure 11:
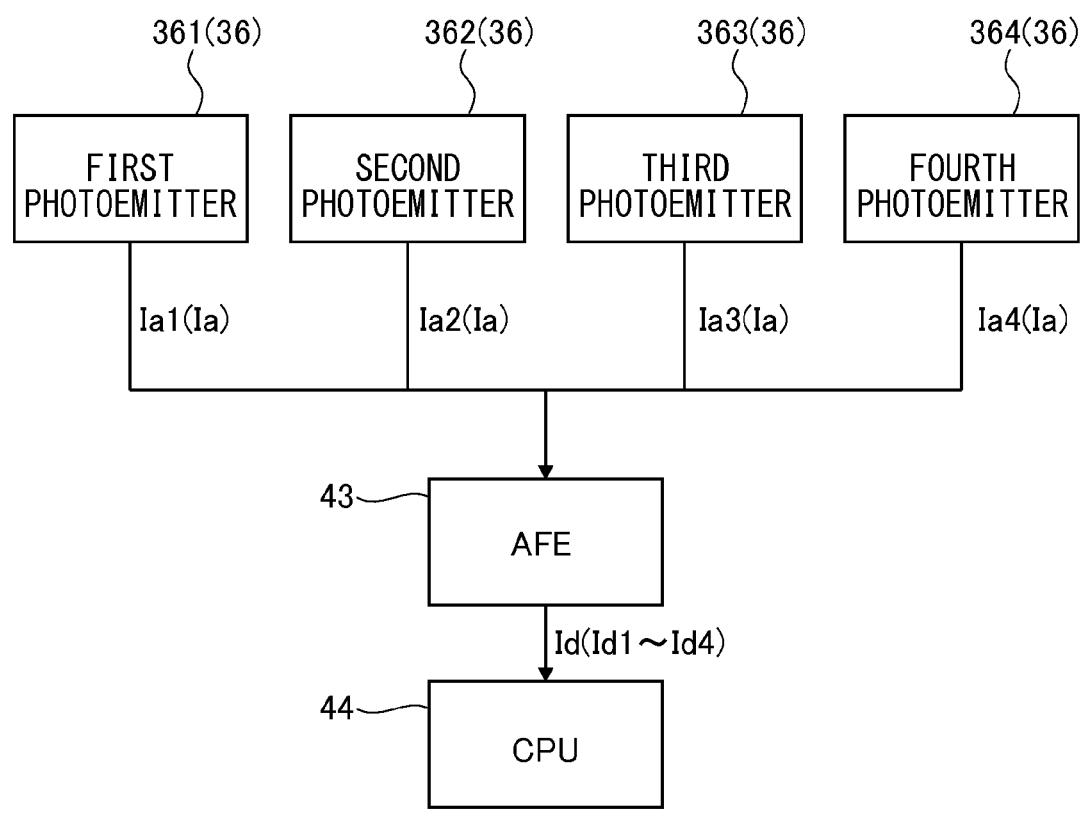
FIG. 11 is an explanatory view for explaining flows of signals in the angle detection device.

As explained, the angle detection device 30 receives the lights that have been emitted from the four photoemitters 35 and transmitted through the slits 37 of the corresponding scale plates 34 (341, 342) by using the four photodetectors 36 from the time t1 to the time t4. Here, all of the photoemitters 35 emit the lights from the time t2 to time t3, and all of the photodetectors 36 receive the collection signals Dd to store the lights emitted from the corresponding photoemitters 35 from the time t1 to time t4. Therefore, all of the photodetectors 36 receive the lights simultaneously. The CPU 44 of the control section 33 of the angle detection device 30 acquires the digital signals Id (digital image data) representing the entire light-receiving areas, which correspond to the analog signals Ia (analog image data) acquired by the photodetectors 36, as illustrated in FIG. 11. Note that the signal switch 42 is not illustrated in FIG. 11.

To be specific, the first photodetector 361 outputs the first analog signals Ia1 (analog image data) representing the entire light-receiving area of the first photodetector 361 to the AFE 43. The AFE 43 then converts the first analog signals Ia1 into the first digital signals Id1 (digital image data) representing the entire light-receiving area of the first photodetector 361, and inputs the first digital signals Id1 (digital image data) to the CPU 44. Here, the AFE 43 converts each analog signal Ia outputted from each light-receiving element (i.e., each pixel of the first photodetector 361) into the first digital signal Id1 and outputs each of the first digital signal Id1 to the CPU 44. Accordingly, the CPU 44 takes time to execute the data processing on the entire light-receiving area of the first photodetector 361 in order to acquire the first digital light-receiving singles Id1 (digital image data) representing the entire light-receiving area of the first photodetector 361 through the AFE 43. The second photodetector 362 outputs the second analog signals Ia2 (analog image data) representing the entire light-receiving area of the second photodetector 362 to the AFE 43. The AFE 43 then outputs the second digital signals Id2 (digital image data), which are converted from the second analog signals Ia2 and represent the entire light-receiving area of the second photodetector 362, to the CPU 44. Similarly, the third and fourth digital signals Id3, Id4 (digital image data) representing the entire light-receiving areas of the third and fourth photodetectors 363, 364 are outputted to the CPU 44 through the AFE 43.

Since the analog signals Ia of the first to fourth photodetectors 361-364 are sequentially outputted to the AFE 43; the second photodetector 362, the third photodetector 363, and the fourth photodetector 364 need to wait for outputting the corresponding analog signals Ia until the CPU 44 receives the digital image data from the preceding photodetector(s) 36. Here, the angle detection device 30 of the embodiment uses the CMOS image sensors as the photodetectors 36 so as to prevent the deterioration of the detection values (analog signals Ia). As a result, the accuracy of the detection of the angles does not degrade even when the second to fourth photodetectors 362-364 need to wait for outputting the corresponding analog signals Ia.

As explained above, the angle detection device 30 (to be specific, the control section 33 thereof) sequentially outputs the analog signals Ia (analog image data) representing the entire light-receiving area of each of the four photodetectors 36 to the CPU 44 through the AFE 43. The CPU 44 acquires the digital signals Id (digital image data) representing the entire light-receiving area of each photodetector 36. The control section 33 controls the signal switch 42 to change or switch the transmission path connected to the AFE 43 between the photodetectors 36. Hence, the angle detection device 30 of the embodiment can use a single AFE 43 to send the digital signals (digital image data) corresponding to the analog signals (analog image data) that are simultaneously acquired by the four photodetectors 36 to the CPU 44. The control section 33 acquires the digital signals Id (digital image data) with a time period required to execute the data processing on the four light-receiving areas. The CPU 44 then accurately detects or measures the horizontal angle and the vertical angle of the telescope unit 14 with respect to the collimation direction based on the digital signals Id (i.e., based on the digital image data acquired by the four photodetectors 36).

Next, a problem of a conventional angle detection device 50 having a plurality of photodetectors 36 will be explained with reference to FIGS. 12 and 13. The conventional angle detection device 50 also detects or measures a horizontal angle and a vertical angle of a telescope unit 14 of a survey instrument 10 with respect to the collimation direction. Note that the same configurations of the conventional angle detection device 30 as in the angle detection device 30 of the embodiment are given with the same reference characters, and their explanation will be omitted.

Figure 12:
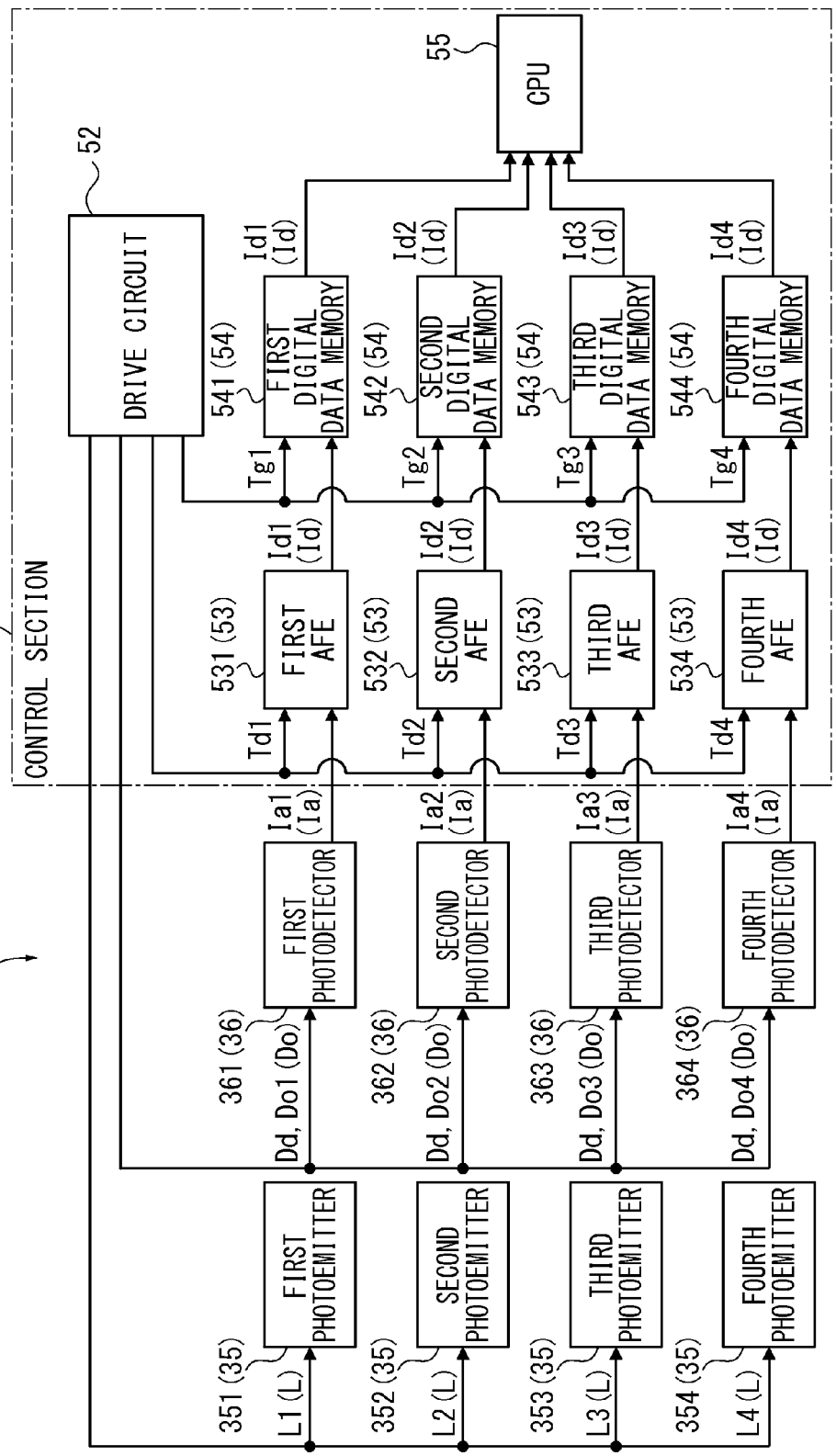
FIG. 12 is a block diagram showing a configuration of a conventional angle detection device.

As illustrated in FIG. 12, the conventional angle detection device 50 includes a control section 51. The control section 51 includes a drive circuit 52, four AFEs 53, four digital data memories 54, and a CPU 55. Note that the drive circuit 52, each of AFEs 53, and the CPU 55 are basically identical to the drive circuit 41, the AFE 43, and the CPU 44 of the control section 33 included in the angle detection device 30.

The four AFEs 53 (specifically, the first AFE 531, the second AFE 532, the third AFE 533, and the fourth AFE 534) are connected to the four photodetectors 36 respectively and process analog signals Ia acquired by the corresponding photodetectors 36.

The four digital data memories 54 (specifically, the first digital data memory 541, the second digital data memory 542, the third digital data memory 543, and the fourth digital data memory 544) are connected to the four AFEs 53 respectively and temporally store digital signals Id produced by the corresponding AFEs 53. To be specific, each digital data memory 54 temporally stores the digital signals Id upon receiving an acquisition-timing signal Tg (Tg1-Tg4) from the drive circuit 52.

Similar to the control section 33 of the angle detection device 30, the control section 51 of the conventional angle detection device 50 outputs light-emitting signals L (L1-L4) to the photoemitters 35 (351-354) and collection signals Dd to the photodetectors 36 (361-364) from the drive circuit 52. By receiving the collection signal Dd, each photodetector 36 produces analog signals Ia (Ia1-Ia4). The control section 51 then outputs output signals Do (Do1-Do4) to the photodetectors 36 (361-364), convert-timing signals Td (Td1-Td4) to the AFEs 53 (531-534), acquisition-timing signals Tg (Tg1-Tg4) to the digital data memories 54 (541-544) from the drive circuit 52. Accordingly, each photodetector 36 outputs analog signals Ia (Ia1-Ia4) to the corresponding AFE 53, and each AFE 53 produces digital signals Id (Id1-Id4) after amplifying and removing noise from the analog signals Ia and outputs the produced digital signals Id to the corresponding digital data memory 54. The control section 51 of the conventional angle detection device 50 can store the digital signals Id (digital image data), which correspond to the lights received by the entire light-receiving areas of the photodetectors 36, in the corresponding digital data memories 54. The digital data memories 54 then sequentially output the stored digital signals Id (Id1-Id4) to the CPU 55. With this, the CPU 55 acquires the digital signals Id (digital image data) corresponding to the lights received by the entire light-receiving areas of the four photodetectors 36.

Figure 13:
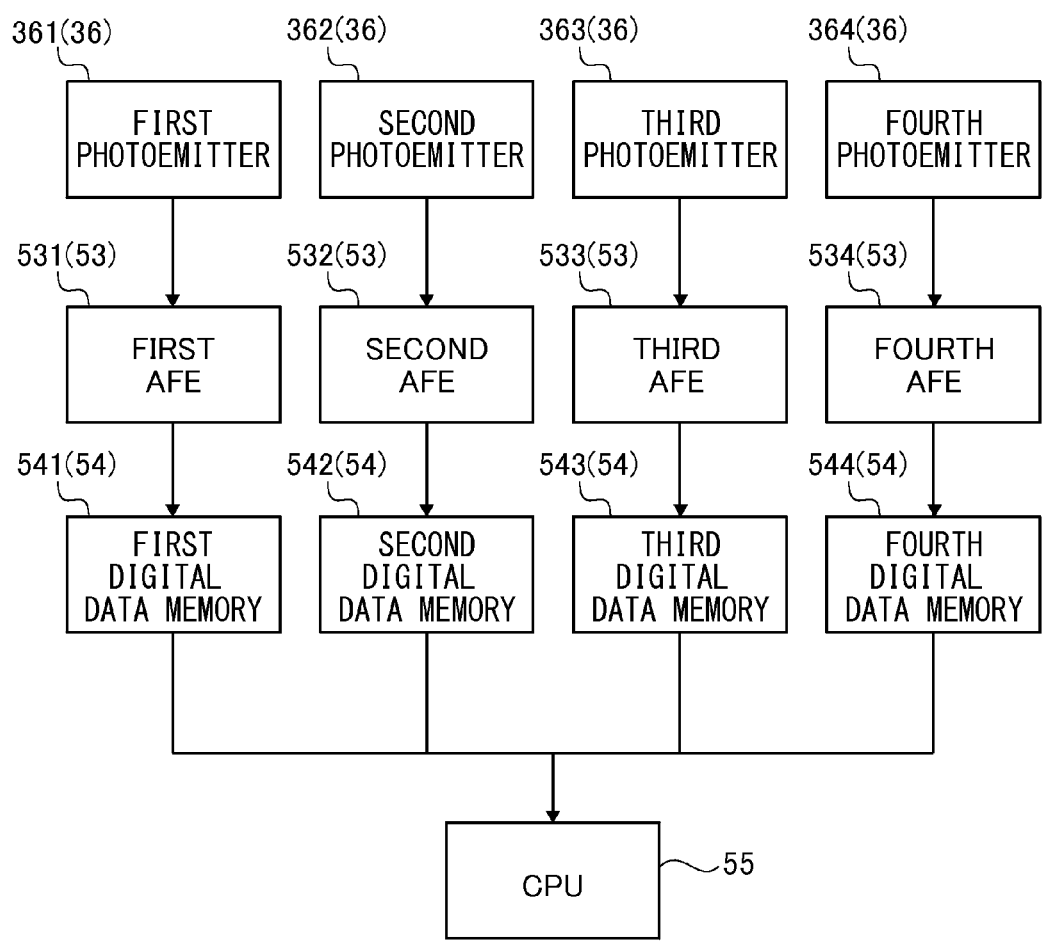
FIG. 13 is an explanatory view similar to FIG. 11, but for explaining flows of signals in the conventional angle detection device.

As illustrated in FIG. 13, the analog signals Ia (Ia1-Ia4) received by the corresponding photodetectors 36 (361-364) are outputted to the corresponding AFEs 53 (531-534) as analog image data. Each of the AFEs 53 then produces and outputs the digital signals Id (Id1-Id4) (digital image data) to the corresponding digital data memory 54 (541-544). To be specific, each of the AFEs 53 converts the analog signals Ia acquired by the photo detection elements (pixels) of the corresponding photodetector 36 into the digital signals Id and outputs the converted digital signals Id to the corresponding digital data memory 54. Here, the four AFEs 54 simultaneously acquire the digital signals Id from the four photodetectors 36, and the four digital data memories 54 simultaneously store the digital signals Id (digital image data) of the four photodetectors 36. Hence, the control section 51 of the conventional angle detection device 50 can execute the above data processing for four photodetectors 36 in a time period required for executing the data processing for one photodetector 36 (i.e., the conventional angle detection device 50 can execute the data processing in parallel for all of the four photodetectors 36).

The digital signals Id (digital image data) representing each of the entire light-receiving area are then sent to the CPU 55 from the corresponding digital data memory 54. Here, the four digital data memories 54 sequentially output the digital signals Id (digital image data) to the CPU 55. In other words, each of the digital data memories 54 individually requires a certain period of time for switching the transmission path to the CPU 55 and for outputting or transmitting the stored digital signals Id (digital image data) to the CPU 55. As a result, the control section 51 of the conventional angle detection device 50 requires a time period for executing the data processing to acquire the digital signals Id (digital image data) and a time period for switching the transmission paths and for respectively transmitting the four sets of the digital signals Id (digital image data) from the digital data memories 54 to the CPU 55.

As explained, the control section 51 of the conventional angle detection device 50 includes the four AFEs 53 respectively connected to the four photodetectors 36. With this, it can execute the data processing for the four photodetectors 36 simultaneously. However, the AFEs 53 do not have a function to store the inputted analog signals Ia and the produced digital signals Id. Therefore, when the four AFEs 53 produce the digital signals Id, all of the four AFEs 53 need to immediately output the produced digital signals Id (Id1-Id4). Without memories such as the digital data memories 54, the digital signals Id would be outputted to and mixed with each other in the CPU 55. In such a case, the CPU 55 is unable to distinguish which digital signal represents which digital image data. To overcome this drawback, the control section 51 of the conventional angle detection device 50 includes the four digital data memories 54 for the four AFEs 53 respectively, such that the digital signals Id (digital image data) produced with each photodetector 36 are outputted and temporally stored in the corresponding digital data memory 54. Further, the stored digital signals Id (digital image data) are sequentially outputted to the CPU 55 from the digital data memories 54. With this, the control section 51 of the conventional angle detection device 50 can acquire and process the digital signals Id (digital image data) corresponding to the lights received by the four light-receiving areas of the four photodetectors 36.

The conventional angle detection device 50, however, needs as many the AFEs 53 and the digital data memories 54 as the photodetectors 36, resulting in an increase in the size of the circuit of the control section 51. Besides, the conventional angle detection device 50 requires a time period for executing the data processing and a time period for switching the transmission paths and for respectively transmitting four sets of the digital signals Id (digital image data) from the digital data memories 54 to the CPU 55.

In contrary, the angle detection device 30 according to the embodiment of the present invention is configured to output the analog signals Ia of the light-receiving area (the entire light-receiving area) of each photodetector 36 to the single AFE 43, and to output the digital signals Id produced in accordance with the analog signals Ia from the AFE 43 to the CPU 44 (arithmetic processor). Specifically, the angle detection device 30 of the embodiment sequentially executes the above process for each photodetector 36. Accordingly, the angle detection device 30 can acquire the digital signals Id (digital image data) of the four photodetectors 36, which correspond to the analog signals Ia (analog image data) simultaneously acquired by the four photodetectors 36, by using the single AFE 43. Since the angle detection device 30 of the embodiment does not need as many the AFEs 43 as the photodetectors 36, it can prevent from increasing in the size of the circuit of the control section 33 of the angle detection device 30.

As explained above, the angle detection device 30 is configured to output the acquired analog signals Ia from one of the photodetectors 36 to the single AFE 43 and to output the digital signals Id produced by the AFE 43 to the CPU 44 (arithmetic processor). Specifically, the angle detection device 30 of the embodiment executes the above process for the photodetectors 36 one by one in sequence. Therefore, the angle detection device 30 of the embodiment can decrease the number of the AFEs 43 less than the number of the photodetectors 36, and the angle detection device 30 can detect both the horizontal angle and the vertical angle of the telescope unit 14 by using the plurality of the photodetectors 36 at the same time. Since the angle detection device 30 of the embodiment can increase or decrease the number of the AFEs 43 regardless of the number of the photodetectors 36, it can improve the flexibility in design of the angle detection devices.

Further, the angle detection device 30 is configured to include the signal switch 42. With this, the angle detection device 30 can output the analog signals Ia (analog image data) from one of the four photodetectors 36 to the single AFE 43. Here, the signal switch 42 is configured to only connect one of the four photodetectors to the AFE 43. Hence, having the signal switch 42 hardly increases the size of the circuit of the control section 33 of the angle detection device 30. Besides, the signal switch 42 is configured to select one of the photodetectors 36 upon receiving the switching signal S, i.e., the signal switch 42 can easily select and connect the transmission paths.

The angle detection device 30 is configured such that it can prevent deterioration of the detection values (analog signals Ia) from the time when the photodetectors 36 acquires the detection values till the time when the photodetectors 36 output the detection values. With this, it can suppress degradation in the accuracy in detecting the angles although the angle detection device 30 needs to wait for outputting the acquired detection values (analog signals Is) from the photodetectors 36 until the preceding photodetector(s) 36 finishes outputting the detection values. If an angle detection device 30 includes a plurality of photodetectors 36 that cannot suppress deterioration of detection values (analog signals Ia) with a single AFE 43, the photodetectors 36 need to receive the lights and to output the analog signals Ia to the AFE 43 one by one in sequence, instead of receiving the lights simultaneously, or the accuracy in detecting the angles decreases. In other words, the angle detection device 30 with such a configuration cannot detect the angles by using the plurality of photodetectors 36 at the same time, resulting in degradation in the accuracy.

To be specific, the photodetectors 36 are configured with the CMOS image sensors, such that the angle detection device 30 of the embodiment can easily prevent the deterioration of the detection values (analog signals Ia). Note that CCD image sensors are configured to store electric charges the amount of which corresponds to the amount of the lights received by the photo detection elements (pixels) and to keep the electric charges to hold the detection values. Accordingly, the CCD image sensors are easily affected by noise and the like and thus are difficult to suppress the deterioration of the detection values (analog signals Ia).

Further, the angle detection device 30 only requires a time period for executing the data processing on the four light-receiving areas by using the single AFE 43 in order for the CPU 44 to acquire the digital signals Id (digital image data) representing the four light-receiving areas of the four photodetectors 36. Accordingly, the angle detection device 30 can accelerate the whole data processing speed comparing to the conventional angle detection device 50, which uses four AFEs 53.

The angle detection device 30 is configured to simultaneously receive the lights with the four photodetectors 36 upon receiving the same collection signals Dd. With this, the angle detection device 30 can detect the horizontal angle and the vertical angle of the telescope unit 14 at the same time with a simple structure and with a simple control.

The control section 33 of the angle detection device 30 simultaneously and individually sends the light-emitting signals L (L1-L4) to the photoemitters 35 for eliminating the influence of individual differences of the photoemitters 35. With this, the angle detection device 30 can simultaneously emit the lights from the photoemitters 35 with a simple structure and with a simple control, thereby achieving appropriate angle detections.

In the angle detection device 30, two pairs of the photoemitters 35 and the photodetectors 36 for each scale plate 34 are disposed so as to be rotationally symmetric with respect to the rotational center of the corresponding scale plate 34. With this, the angle detection device 30 can negate detection errors caused by wobbling of the rotary shafts (not illustrated) of the scale plates 34. Further, the angle detection device 30 is configured to simultaneously receive the lights by the two photodetectors 36 to acquire the analog signals Ia (analog image data) and the digital signals Id (digital image data) corresponding to the analog signals Ia with the CPU 44. With this, the angle detection device 30 can detect the angles more appropriately.

The survey instrument 10 includes the angle detection device 30. With this, the above effects are also applied to the survey instrument 10.

The survey instrument 10 detects or measures the horizontal angle and the vertical angle of the telescope unit 14 with respect to the collimation direction by using the angle detection device 30. Specifically, the survey instrument 10 detects the horizontal angle and the vertical angle simultaneously. Accordingly, the survey instrument 10 can accurately detect the horizontal angle and the vertical angle even while shifting the collimation direction of the telescope unit 14. With this, it can improve the usability of the survey instrument 10.

Figure 14:
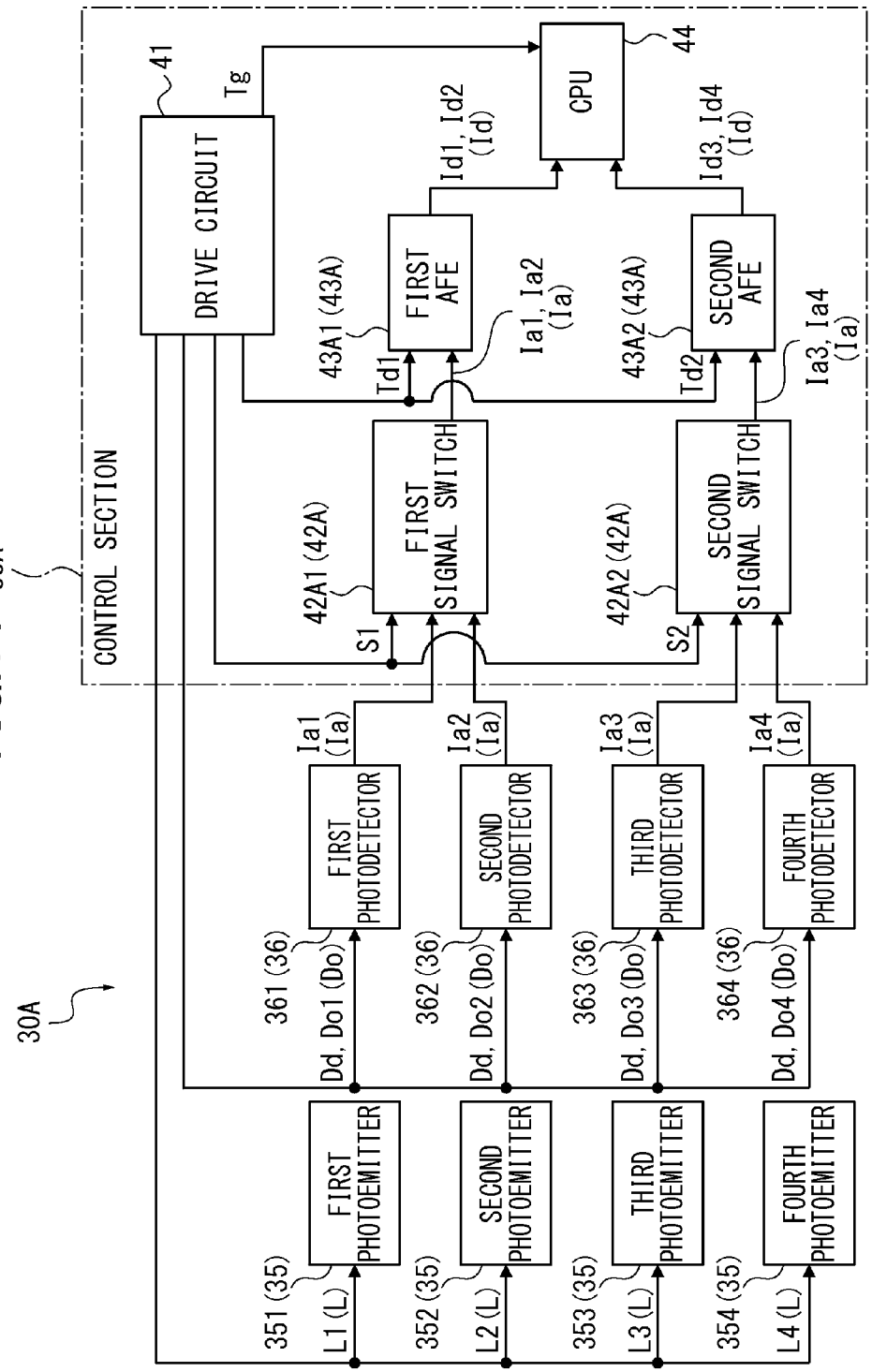
FIG. 14 is a block diagram similar to FIG. 7, but showing a configuration of another example of an angle detection device.

Although the angle detection device 30 of the embodiment is configured to include the single AFE 43 together with the four photodetectors 36, the number of the AFE 43 should not be limited one. As explained above, the angle detection device 30 is configured to output the digital signals Id, which are produced from the analog signals Ia, from one of the photodetectors 36 to the single AFE 43 and to execute the above process for all of the photodetectors 36 one by one in sequence. Therefore, any angle detection device 30 that includes less AFEs 43 than the photodetectors 36 should be applicable. An example of the configuration is illustrated in FIG. 14. As illustrated, an angle detection device 30A (to be specific, the control section 33A thereof) includes a first AFE 43A1 for the first photodetector 361 and the second photodetector 362 (i.e., the horizontal angle detection section 31) and a second AFE 43A2 for the third photodetector 363 and the fourth photodetector 364 (i.e., the vertical angle detection section 32). Accordingly, the angle detection device 30A includes a first signal switch 42A1 for selectively connecting one of the first and second photodetectors 361, 362 to the first AFE 43A1 and a second signal switch 42A2 for selectively connecting one of the third and fourth photodetectors 363, 364 to the second AFE 43A2. The angle detection device 30A also can detect angles of the telescope unit 14 by using the plurality of the photodetectors 36 at the same time and can decrease the number of the AFEs 43A compared to the number of the photodetectors 36, thereby suppressing an increase in the size of the circuit of the control section 33A compared to that of the control section 51 of the conventional angle detection device 50.

Figure 15:
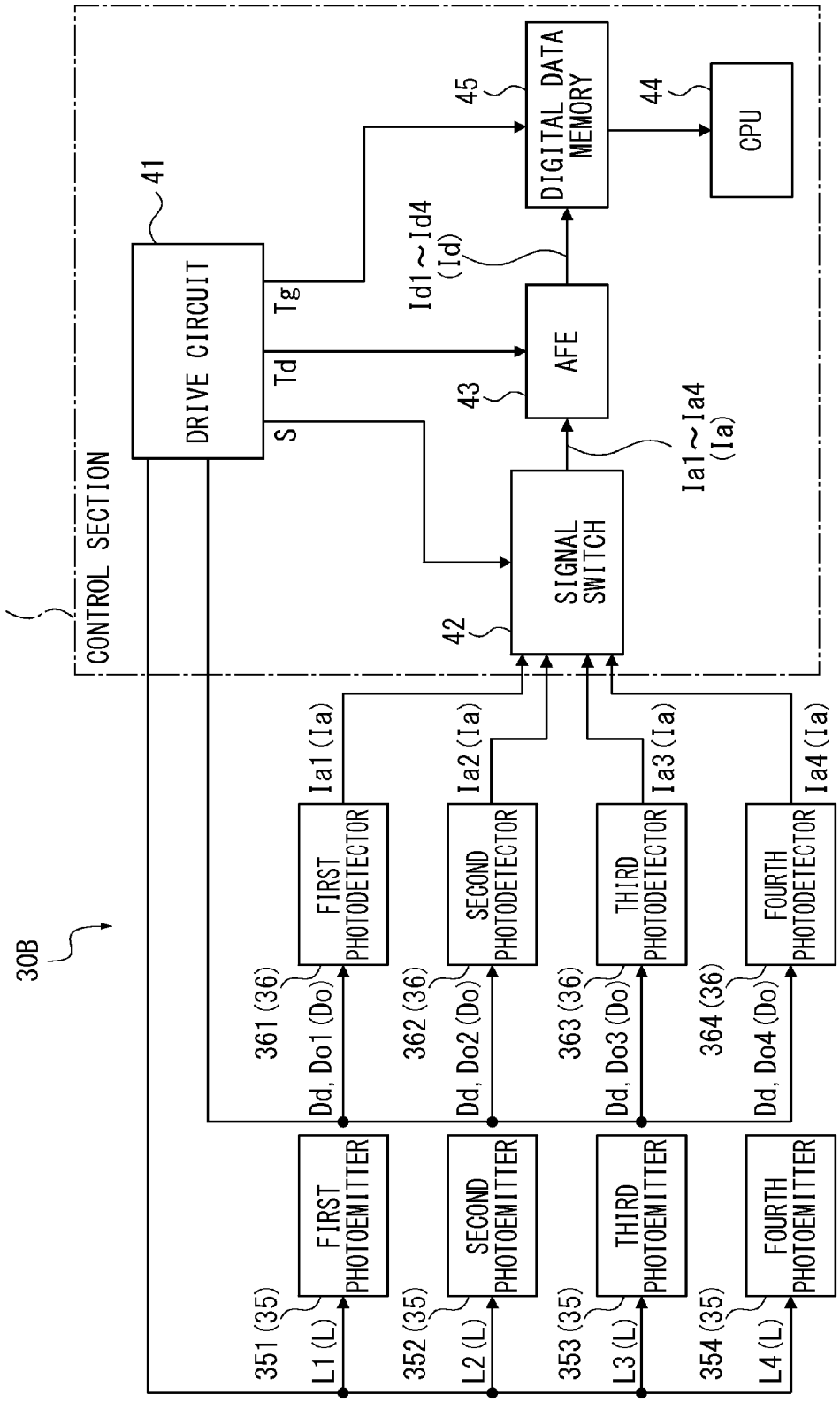
FIG. 15 is a block diagram similar to FIG. 7, but showing a configuration of the angle detection device of the embodiment having a digital data memory.

The angle detection device 30 of the embodiment is configured to output the digital signals Id (digital image data) representing the entire light-receiving area of one of the photodetectors 36 to the CPU 44 (arithmetic processor) from the AFE 43 at one time. However, it should not be limited thereto. As illustrated in FIG. 15, an angle detection device 30B (to be specific, the control section 33B thereof) including a digital data memory 45 between the AFE 43 and the CPU 44 is also applicable depending on the required processing speed and/or the processing capacity of the CPU 44 (arithmetic processor). Similar to the CPU 44 of FIG. 7, the digital data memory 45 acquires digital signals Id (digital image data) representing the four light-receiving areas of the four photodetectors 36 from the AFE 43. The digital data memory 45 then outputs the acquired digital signals Id (digital image data) to the CPU 44. The angle detection device 50 also can detect the angles of the telescope unit 14 by using the plurality of the photodetectors 36 at the same time. Further, it can suppress an increase in the size of the circuit of the control section 33B compared to that of the conventional angle detection device 50.

Although the photodetectors 36 of the embodiment are configured with the CMOS image sensors, they should not be limited thereto. Any photodetectors that can prevent deterioration of the detection values (analog signals Ia) from the time when the photodetectors acquire and store the detection values till the time when the photodetectors output the detection values are applicable.

In the embodiment, it is configured such that the lights emitted from the photoemitters 35 transmit through the slits 37 of the corresponding scale plates 34 and are received by the corresponding photodetectors 36. However, it should not be limited thereto. As long as the photodetectors 36 are able to detect or measure the scale of the corresponding scale plates 34 by receiving the lights emitted from the corresponding photoemitters 35, any configuration is applicable.

In the embodiment, one pair of the photoemitter 35 and the photodetector 36 is 180° rotationally symmetric to the other pair of the photoemitter 35 and the photodetector 36 with respect to the rotational center of the corresponding scale plate 34. However, it should not be limited thereto. As long as the photoemitters 35 and the photodetectors 36 are disposed to be rotationally symmetric with respect to the rotational center of the corresponding scale plates 34 in order to negate angle detection errors caused by wobbling of the rotary shafts of the scale plates 34, any configuration is applicable.

In the embodiment, the angle detection device 30 is configured to detect the horizontal angle and the vertical angle of the telescope unit 14 of the survey instrument 10 with respect to the collimation direction. However, it should not be limited thereto. As long as the angle detection device 30 is able to detect angles by using the plurality of photodetectors 36 at the same time, the angle detection device 30 may detect single angle (e.g., one of the horizontal angle and the vertical angle of the telescope unit 14 of the survey instrument 10 with respect to the collimation direction) or detect more than two angles.

In the embodiment, the angle detection device 30 is configured to include a plurality of (two) pairs of the photoemitters 35 and photodetectors 36 in a rotation symmetry for each scale plate 34 so as to negate angle detection errors caused by wobbling of the rotary shaft of the scale plate 34. However, the angle detection device 30 may include only one pair of the photoemitter 35 and photodetector 36 for each scale plate 34.

In the embodiment, the angle detection device 30 is installed in the survey instrument 10. However, it should not be limited thereto. The angle detection device 30 may be installed in any other devices that detect angles by using the plurality of the photodetectors 36 at the same time.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An angle detection device, comprising:
a plurality of photoemitters;
a plurality of photodetectors each forming a linear light-receiving area, the plurality of the photodetectors being configured with CMOS image sensors, the plurality of the photodetectors being paired to the plurality of the photoemitters, respectively;
a scale plate disposed between the plurality of the photoemitters and the plurality of the photodetectors; and
a control section that controls the plurality of the photoemitters and the plurality of the photodetectors;
wherein the control section includes at least one analog-front-end that converts analog signals sent from each of the plurality of the photodetectors into digital signals, a number of the at least one analog-front-end being less than a number of the plurality of the photodetectors, an arithmetic processor that detects a rotating posture of the scale plate based on the converted digital signals, and a signal switch that selectively connects one of the plurality of the photodetectors to the at least one analog-front-end, wherein the at least one analog-front-end does not have a memory to temporarily store the analog signals and the digital signals, and wherein the control section simultaneously emits lights from the plurality of the photoemitters, simultaneously receives the emitted lights by the corresponding photodetectors respectively, and executes data processing of:

sending a switching signal to the signal switch to switch the photodetector to be connected for outputting the analog signals, sending an output signal to each photodetector separately, outputting the analog signals acquired by the photodetectors simultaneously and representing an entire area of the light-receiving area of one of the plurality of the photodetectors to the at least one analog-front-end, converting the outputted analog signals into the digital signals with the at least one analog-front-end, and outputting the converted digital signals to the arithmetic processor, for each of the plurality of the photodetectors one by one in sequence.

2. The device as claimed in claim 1, wherein each of the plurality of the photodetectors stores the analog signals as preventing deterioration of the stored analog signals.

3. The device as claimed in claim 1, wherein the control section sends identical collection signals to the plurality of the photodetectors to simultaneously receive the lights by the plurality of the photodetectors.

4. The device as claimed in claim 1, wherein the control section individually and simultaneously sends light-emitting signals to the plurality of the photoemitters, the light-emitting signals adjusting light-emission intensities of the plurality of the photoemitters for eliminating influence of individual differences of the plurality of the photoemitters.

5. The device as claimed in claim 1, further including a plurality of pairs of the photoemitters and the photodetectors, wherein the pairs are disposed to be rotationally symmetric to each other with respect to a rotational center of the scale plate.

6. The device as claimed in claim 1, wherein the control section includes a digital data memory that is disposed between the at least one analog-front-end and the arithmetic processor and stores the digital signals, wherein the control section executes a data processing of:
outputting the analog signals representing the entire area of the light-receiving area of one of the plurality of the photodetectors to the at least one analog-front-end, converting the outputted analog signals into the digital signals with the at least one analog-front-end, and outputting the converted digital signals to the arithmetic processor, for each of the plurality of the photodetectors one by one in sequence, and the control section inputs the stored digital signals from the data memory to the arithmetic processor one by one in sequence.

7. A survey instrument, comprising:
the angle detection device according to claim 1;
a survey unit that is adapted to measure a distance to and direction of a measuring object; and
a control unit that controls the survey unit.

8. The survey instrument as claimed in claim 7, further including a telescope unit that collimates the survey instrument with respect to the measuring object;

wherein the angle detection device detects a horizontal angle and a vertical angle of the telescope unit with respect to a collimation direction.

* * * * *